United States Patent [19]

Urs

[11] 3,969,128

[45] July 13, 1976

[54] PIGMENT ADDITIVE FOR PROTECTIVE AND DECORATIVE COATINGS

[76] Inventor: Bhaskar Raj Urs, 3021 Simpson St., Evanston, Ill. 60201

[22] Filed: Dec. 6, 1973

[21] Appl. No.: 422,359

[52] U.S. Cl. .............................. 106/291; 106/308 Q; 106/309; 106/288 B
[51] Int. Cl.² .................................................. C09C 3/00
[58] Field of Search ............ 106/288 B, 291, 308 Q, 106/309

[56] References Cited
UNITED STATES PATENTS 3,759,852   9/1973   Bradley ............................... 106/291

*Primary Examiner*—Winston A. Douglas
*Assistant Examiner*—J. V. Howard
*Attorney, Agent, or Firm*—Irving Faber

[57] ABSTRACT

This invention relates to a new and useful coating for protecting surfaces. The coating is not only decorative but is resistant to chemicals, abrasives, and to weather. The invention consists of adding fragmented glass bubbles to a protective coating solution such as paint. Prior to fragmentation of the glass bubbles they are treated with either a hydro or oleo phobic agent which will cause the fragmented bubble pieces to rise to the paint's surface. The fragmented bubbles form a glass surface when the protective coating is applied to a substrate. The untreated surfaces of the glass bubbles, that is the interior portion of the glass bubble prior to fragmentation, form a bond between themselves and the protective coating.

7 Claims, No Drawings

PIGMENT ADDITIVE FOR PROTECTIVE AND DECORATIVE COATINGS

BACKGROUND OF INVENTION

This invention relates to a new and useful protective coating for walls, machine surfaces and the like that is not only decorative, but is resistant to chemicals, abrasives and weather, and in particular relates to a new type of pigment for existing protective coating compositions such as paint.

The art of protective coating compositions such as paint and the like is very extensive. It is well known that paint compositions consist of some or all of the following ingredients: binders, solvents, diluents, reactive diluents, pigments for color, fillers, and additives for accomplishing special functions such as rapid drying time, flow out, etc.

The latest patent that the inventor is aware of regarding the treatment of glass flakes for paint is that of William J. Bradley, U.S. Pat. No. 3,759,852, issued on Sept. 18, 1973. In this patent, Bradley adds glass flakes to his paint. The glass flakes are treated with a leafing agent prior to mixing with the organic resin compositions, which cause the flakes to migrate to the surface of the paint when applied to a wall or other substrate. The migrating glass flakes orient themselves in layers at the surface of the coating to form a veneer, which inhibits the flow of corrosive or other damaging compositions through the coating to the protected substrate. It is to be noted that the entire glass flake is precoated with a leafing agent such as stearic acid and with a wetting agent. The wetting agent must be compatible with the leafing agent. The leafing agent individually or in combination with a wetting agent, as described in the aforesaid patent will not mix homogeneously with the organic resin compositions and will migrate to the surface of the applied coating. However, the glass flakes, as stated by Bradley, do not mix homogeneously with the resin coating thereby causing various problems, one of which is that the glass flakes have no bond to the protective resin coating. Therefore, the glass flakes could be rubbed off by anyone passing their hands, a cloth, a brush, etc., over the protected area after the resin has dried, resulting in reduced efficiency of the coating after a short time. The glass flakes can also be very dangerous for both adults and children, if after rubbing the dried surface, the glass particles reach the mouth. A familiar example of particle rub-off is in leafing aluminum paint where the aluminum pigment can be smeared or wiped off after the paint film has completely dried just by a mere touch of one's finger; this leaves a permanent smudge on the completely dried paint. Another inherent disadvantage of applying totally treated glass flakes to a resin composition is that those flakes, pigmented or not, will rub off on one's skin and/or clothes if they brush against the treated surface. Another disadvantage of the Bradley patent is that the leafing agent and/or wetting agent acts as a conduit for corrosive material to reach the substrate.

There is a need for protecting surfaces with paint and other type protective coatings that are safe and are also resistant to weather, chemicals, and abrasives. There have been many attempts to fulfill this need, however, to the best knowledge of the inventor, no one has achieved this end.

The present invention not only provides a decorative surface but one that is more resistant to chemicals, weather and abrasion than heretofore known by using treated fragmented hollow glass bubbles that will form a glass surface but the fragmented glass pieces will not rub off when brushed against after the protective coating composition has dried. The adhesion of the glass fragments to the protective coating composition is accomplished by applying the leafing and/or wetting agent only to the exterior surface of the hollow glass bubble. The glass bubble when fragmented will only have one of its plurality of faces treated while the remaining faces will bind themselves to the coating once it has migrated to the outer surface of the protective coating.

SUMMARY OF INVENTION

The present invention incorporates an additive for organic and inorganic compositions such as paint and the like to form a glass surface on the exterior of the finish resistive to chemicals, weather, and abrasion. Basically, the invention comprises the addition of treated fragmented hollow glass bubbles into an organic and inorganic composition. Hollow glass balls or bubbles, commercially available having a wall thickness of approximately one-half (½) micron to about ten (10) microns and having a diameter of twenty-five (25) microns to two hundred (200) microns is treated with a leafing and/or wetting agent. The leafing and/or wetting agent is compatible with the paint composition but has sufficient repellence to cause it to rise to the surface of the paint film. The interior surface of the bubble is not treated so that when the bubble is fractured, the fragments have only one of a minimum of six surfaces treated with the leafing and/or wetting agent. The fractured pieces will migrate to the surface of the protective coating when applied to a substrate because of the leafing and/or wetting agent and form a glass surface. However, the untreated surfaces will be free to adhere to the protective composition, inhibiting the fragments from leaving the coated surface once the composition has dried. The amount of glass flakes is substantially reduced by using fragmented glass bubbles because of the adhesion characteristic of the untreated surfaces. The less glass used per gallon of coating the less expensive the coating is thereby achieving a very desirable end.

The principal object of the invention is to provide a pigment additive for organic and inorganic compositions that will form a glass surface when the composition is applied to a substrate.

A further object of this invention is to provide a protective composition with a pigment additive that will migrate to the surface of the coating when applied to a substrate and will also form an adhesive bond with the composition to inhibit the pigment from leaving the composition once it dries.

Still a further object of the invention is to provide a pigment additive for organic and inorganic compositions that is treated on one of a plurality of surfaces; said treatment causing the migration of the pigment to the surface of the composition when applied to a substrate.

A further object of the invention is to provide a pigment additive to organic and inorganic compositions that will cause the composition to be more resistive to chemicals, weather, and abrasion that heretofore possible.

DESCRIPTION OF PREFERRED EMBODIMENT

This invention relates to a pigment additive for protective coatings such as paints, mastics, lacquers, varnishes, powder coatings and the like. These coatings shall be referred to hereinafter as "paint"; however, this term includes all coating substances for protective and/or decorative purposes.

It is well known in the art that paint consists of a composition of some or all of the following ingredients: binders, solvents, reactive diluents, fillers, pigments and additives for special effects such as drying time, flow out, etc. The paint art has consistently strived to make the paint surface or film more resistant to permiation by abrasion, chemicals and weather as heretofore been possible. Until now various methods were used such as adding various chemical additives but, for every achievement there has been a corresponding problem. The latest method is expressed in U.S. Pat. No. 3,759,852 issued Sept. 18, 1973, to William J. Bradley. The patent discusses the formation of a veneer surface on the paint formed by leafing glass flakes. However, when the glass flakes leaf they can be easily rubbed off once the paint is dry. This not only destroys the protective veneer but also is dangerous. Leafing is the process in which glass, aluminum flakes, or the like are treated with a leafing agent which inhibits their attraction to the composition or paint that they are added to, thereby enabling the glass flakes or platelets to rise to the surface. The flakes rise to the surface by simply seeking the path of least resistance and once they arrive at the outer surface of the paint, known as the paint film, they form a veneer. The leafing agent depends upon the composition of the paint and the platelet; there being agents well known in the art for every type of paint composition and type of platelet. As stated above, the platelets or glass flakes are rendered either hydrophobic or suitably oleophobic by the treating or wetting process. When the platelets are rendered either hydrophobic, for water base paints or suitably oleophobic for resin based paints they do not adhere to the surface of the paint but more or less cling thereto making removal very easy by simply rubbing against the surface. Once the veneer has been destroyed by the easy removal of the platelets the substrate which the paint was applied to becomes more vulnerable to corrosion, abrasion, and chemical attack; the purpose of the glass flakes being substantially reduced. In my preferred embodiment I use hollow spherical glass bubbles. However, it is understood that the bubbles do not have to be spherical nor do they have to be glass. The basic criteria is that the bubbles should be hollow. It is further understood that the bubbles can be made from other material such as aluminum, stainless steel, etc. It is preferable that the wall thickness of the bubble range between one-half (½) micron and ten (10) microns and have a diameter of approximately twenty-five (25) microns to two hundred (200) microns. The bubbles, which are available commercially from several sources, are treated with a wetting or leafing agent well known in the art on the exterior surface only. The type of wetting or leafing agent depends upon the paint composition to which it is being added. If the paint composition is that of the water base type then the agent should be such that it will render the bubble or fragments thereof hydrophobic. If the paint composition is of the organic resin type then the agent should be such that it will render the bubble suitably oleophobic.

The treated bubbles are then fractured by means well known in the art. The fractured pieces of the bubbles have a minimum of six surfaces, only one of which is either hydrophobic or suitably oleophobic. The fractured pieces are added to the paint. The quantity of bubbles per gallon depends upon the type of paint, its ultimate use and the thickness of the paint film. The more bubbles used the more fragments per gallon the thicker the glass surface will be and vice versa. The fractured glass arc spheres or pieces when added in the paint and applied to a substrate will migrate to the outer surface of the paint or the paint film in such a manner as to form a glass surface.

The advantage of using the fragmented glass pieces is that at least five of its surfaces are free to adhere to the paint composition. It is desirable to treat the non oleo or hydro phobic surfaces after fracturing the bubbles with coupling agents; said coupling agents promoting further adhesion of the glass pieces to the paint composition. Coupling agents to achieve greater adherence of the pieces to the composition are well known in the art and are readily avilable. The type of coupling agent used depends upon the paint composition.

In my preferred embodiment the bubbles are of inorganic materials such as silicate glass and ceramic.

The following example serves to illustrate the present invention. The percentages listed are by weight.

EXAMPLE I
Paint Composition for water based epoxy (2 package system)

| Composition of Component No. 1 | | |
|---|---|---|
| Combined pigments, percent | | 60 |
| Aromatic Amine Anchor 1542 | 49.4 | |
| Suspending Agents | 2.0 | |
| Titanium Dioxide | 28.8 | |
| Water | 19.8 | |
| | 100.0 | |
| Composition of Component No. 2 | | |
| Combined pigments, percent | | 40 |
| Treated Bubbles | 24.6 | |
| Epoxy Resin (Epon 826 or equivalent) | 65.1 | |
| Butyl Glycidyl Ether | 8.9 | |
| Suspending Agents | 1.3 | |
| Silane 6040 | 0.1 | |
| | 100.0 | 100 |

The protective coating is achieved by mixing equal volumes of the two components prior to applying the paint to a substrate. An additional quantity of water may be added to the admixture of the two components as may be required prior to application of the paint. The fragmented bubbles, that is their convex surfaces, are rendered hydrophobic by treating the glass bubbles in a 0.5 percent aqueous silane solution; namely, XZ-2-2300 manufactured by Dow Corning Corporation. It is understood that any percentage of silane or its equivalent can be used, however, I found that 0.5 percent is very suitable. The glass bubbles are admixed with the solution of XZ-2-2300; one of several sources of glass bubbles being Emerson & Cuming, Inc., No. IG-101. The 0.5 percent aqueous silane or other leafing agent solution is prepared as per manufacturers recommendations. The glass bubbles and the solution are mixed together gently for about five minutes. A slurry is formed consisting of water and silane molecules that have not attached themselves to the circumferential surface of the bubble. The silane solution or other leafing solution are such that the silane or leafing molecules attach themselves to the bubbles. The slurry is then drained leaving the bubbles with the silane or other leafing agent attached thereto. The bubbles are allowed to dry once the slurry is drained. The bubbles, once dry, are rendered hydrophobic. The silane or other leafing agent molecules form a monomolecular layer on the circumferential bubble surface that will not smear.

The glass bubbles with the "cured" silane solution affixed thereto are fractured by means well known in the art. However, care should be taken to ensure the desired ultimate particle size so that it is not too large or too small. One means of fracturing is by use of a pebble mill and another such means is a three roll mill. The fractured glass pieces, whose convex sides have been rendered hydrophobic by means of the silane solution are now treated in the admixture of component 2 with Dow Corning Z-6040 silane. It is understood that there are coupling agents other than Z-6040 silane as well as other manufacturers than Dow Corning; the purpose of the coupling agent, which is very reactive - not hydrophobic, is to seek out the non hydrophobic coated surfaces of the fractured bubble pieces and attach themselves thereto for creating a strong bond between itself and the admixed paint composition. The convex surface of the glass fragments that have been rendered hydrophobic will migrate to the surface of the paint film. The convex surface is less resistive than the flat glass flake or platelet and will therefore migrate to said film surface more efficiently; the flat platelets which have a tendency to slip to the sides while migrating.

It is understood that untreated bubbles can be used without fracturing. The convex surface of the bubbles improves the bulking value and will reduce shrinkage of the binder when it cures.

It is also understood that the fractured bubbles can be used effectively well with powder coatings.

It is believed tht the invention has been described in such detail as to enable those skilled in the art to understand the same, and it will be appreciated that variations or modifications may be made without departing from the spirit and scope of the invention.

What is desired to secure by letters patent in the United States is:

1. A protective coating composition for application to a substrate, said composition comprising an admixture of:
    a paint composition; and
    a plurality of fractured pieces of a hollow bubble having a wall thickness of one-half to ten microns, wherein said hollow bubble is treated with a leafing agent and then fractured into a plurality of fractured pieces, each of the plurality of fractured pieces having the leafing agent attached to only its convex surface, and the leafing agent being such as to enable the fractured pieces of material to migrate to the outer surface of the paint composition; the untreated surfaces of each of the fragmented pieces inhibiting the fractured pieces from being removed from the outer surface of the coating composition when the coating composition is applied to the substrate.

2. A protective coating composition as defined in claim 1 wherein the fractured pieces of material are inorganic.

3. A protective coating composition as defined in claim 2 wherein the fractured pieces of hollow material are treated with a non-hydrophobic coupling agent, said coupling agent seeking out the untreated surfaces of the fractured material pieces creating a strong bond between the paint composition and the fractured pieces.

4. A protective coating composition as defined in claim 3 wherein the inorganic material is glass.

5. A protective coating composition as defined in claim 4 wherein the hollow material has a diameter of between twenty-five and two hundred microns.

6. A protective coating composition as defined in claim 5 wherein the wall thickness of the hollow material is between one-half micron and ten microns.

7. A protective coating composition as defined in claim 6 wherein said paint composition is comprised of solvents, reactive diluents, fillers and pigments.

* * * * *